United States Patent [19]

Shank, Jr.

[11] Patent Number: 5,152,725
[45] Date of Patent: Oct. 6, 1992

[54] COMPACT, TWO-SPEED, REVERSIBLE DRIVE MECHANISM

[75] Inventor: Samuel R. Shank, Jr., Arnold, Md.

[73] Assignee: United States of America, Washington, D.C.

[21] Appl. No.: 589,574

[22] Filed: Sep. 28, 1990

[51] Int. Cl.$^5$ .......................... F16H 1/28; F16H 1/32
[52] U.S. Cl. ................................ 475/284; 475/311; 475/323
[58] Field of Search ............... 475/284, 311, 314, 315, 475/316, 1, 269, 296, 323, 329

[56] References Cited

U.S. PATENT DOCUMENTS

| | | | |
|---|---|---|---|
| Re. 22,718 | 2/1946 | Carnagua | 475/124 |
| 702,243 | 6/1902 | Parcells | 475/314 |
| 761,495 | 5/1904 | Jaehn | 475/327 |
| 2,283,284 | 5/1942 | Owner | 475/146 |
| 2,347,099 | 4/1944 | Gridley | 475/298 |
| 2,590,280 | 3/1952 | Swift | 475/284 |
| 2,601,045 | 6/1952 | Mayner | 475/35 |
| 2,677,287 | 5/1954 | Calvert | 475/35 |
| 2,821,869 | 2/1958 | Kelbel | 475/284 |
| 2,830,471 | 4/1958 | Steiner | 475/284 |
| 3,094,012 | 6/1963 | Ferguson | 475/207 |
| 3,094,013 | 6/1963 | Ferguson | 475/207 |
| 3,216,280 | 11/1965 | Astberg | 74/882 X |
| 3,503,277 | 3/1970 | Weinrich et al. | 74/882 X |
| 3,788,167 | 1/1974 | Beaudoin et al. | 475/98 |
| 4,296,646 | 10/1981 | Thornton | 475/284 X |
| 4,483,215 | 11/1984 | Ishimaru et al. | 475/284 X |
| 4,617,835 | 10/1986 | Baker, deceased, et al. | 74/882 |

FOREIGN PATENT DOCUMENTS

| | | | |
|---|---|---|---|
| 3130260 | 2/1983 | Fed. Rep. of Germany | 475/314 |
| 492847 | 9/1938 | United Kingdom | 475/284 |
| 539583 | 9/1941 | United Kingdom | 475/284 |

OTHER PUBLICATIONS

*Gear Handbook*, Dudley, Darle W., Ed., pp. 3-14-3-17, McGraw-Hill, 1962, New York.

*Gears*, Merritt, H. E., pp. 447-454, Pittman & Sons, 1954, London.
*Gear Design & Production*, Trautschold, R., pp. 152-153, Columbia Graphs, 1955 Columbia, CT.
*Gear Engineering*, Merritt, H. E., pp. 180-199, Wiley & Sons, 1971, New York.
*Gear Drive Systems*, Lynwander, P., pp. 293-301, 323, Dekker, 1983, New York.
*Industrial & Marine Gearing*, couling, S. A., Chapman & Hall, pp. 71-77, 1962, London.
*Gearing in 1970*, The Institution of Mechanical Engineers, Paper 11, pp. 85-94, 1970, London.
*Mechanisms, Linkages, and Mechanical Controls*, Chironis, N. P., Ed., pp. 316-317, McGraw-Hill, 1966, New York.
*Machinery's Handbook*, 23rd Edition, Ryffel, H. H., Ed., pp. 1936-1941, Industrial Press, Inc., 1988, New York.

*Primary Examiner*—Leslie A. Braun
*Assistant Examiner*—David E. Henn

[57] ABSTRACT

An epicyclic gear mechanism having two forward speeds and one reverse speed, characterized by simplicity and symmetry in design along with a radial output, compact and adaptable to applications requiring close coupling with driving or driven equipment or as an internal drive, versatile as providing alternative or secondary inputs or outputs at either end of the drive shaft in addition to output at the ring gear. The sun gear is rotated by the drive shaft or is fixed, depending on actuation and deactuation of a first clutch and first brake, and the planet carrier is rotated by the drive shaft or is fixed, depending on actuation and deactuation of a second clutch and second brake. Rotation of the ring gear varies in accordance with actuation and deactuation of the pair of clutches and the pair of brakes, providing a neutral mode along with two forward modes and one reverse mode having varying output/input speed ratios which are especially suitable for certain marine and other applications.

34 Claims, 2 Drawing Sheets

COMPACT, TWO-SPEED, REVERSIBLE DRIVE MECHANISM

The invention described herein may be manufactured and used by or for the Government of the United States of America for governmental purposes without the payment of any royalties thereon or therefor.

BACKGROUND OF THE INVENTION

The present invention relates to an epicyclic gear mechanism which provides multiple speeds, more particularly one which provides two forward speeds and one reverse speed.

Epicyclic gear arrangements have been known in the art to offer distinct advantages when used in connection with gas turbine, steam turbine, diesel and other types of engines in automotive, aerospace, marine, industrial and other applications. Epicyclic gearing in general provides a more compact, in-line arrangement with potentially significant savings in space and weight. Rapid speed changes can be achieved without taking gears out of mesh. Smaller size, greater stiffness, and slower operational speed of the components can result in reduced noise and vibratory response and increased efficiency. As horsepower in parallel shaft boxes increases the components therein tend to increase in size and the economic advantage of utilizing epicyclic gearboxes instead becomes increasingly manifest.

For marine applications, for example, utilization of a relatively compact ship propulsion system incorporating an epicyclic gear mechanism can prove particularly advantageous in terms of cost, envelope and efficiency. For "boost/cruise" propulsion systems, wherein two different engines are used, current practice is to operate them one engine at a time. This conventional operational approach, one which is exclusively disjunctive, is less efficient and economical due to greater power inputs, than one which is inclusively disjunctive, wherein both engines can be operated at the same time. In this context epicyclic gear mechanisms may prove especially valuable for recent and future ships employing an advanced electric drive. A large, step-up, combining gear can be used in order to enable a single gas turbine to drive both a propulsion and a ship service generator at their design speeds (approximately 4,000 rpm and 6,000 rpm, respectively); however, this combining gear imposes severe ship arrangement penalties, especially with regard to length. Alternatively, an epicyclic gear arrangement would obviate the need for a combining gear and result in an engine/generator stack-up length well within practical bulkhead spacings.

Moreover, epicyclic gear arrangements can greatly improve fuel economy for single-engine ship propulsion systems. Many current ship propulsion systems with gas turbine engine prime movers employ controllable-pitch (CP) propellers and locked-train, double-reduction (LTDR) gears. The CP propellers are necessary in order to provide reversing capability; the LTDR gears match the engine speed to the propeller speed. The LTDR gear ratio is determined at the design point (full power) and operates at that fixed ratio over the entire range of operation. If the reversing function were performed elsewhere, fixed-pitch (FP) propellers would be used instead of CP propellers. CP propellers are more costly to manufacture and operate, heavier, more complex and less efficient than FP propellers. The fixed ratio of the current LTDR gears forces the single engine (used at endurance ship speed and below) to operate at turbine speeds well below optimum in terms of fuel economy. An epicyclic gear mechanism which provides a second speed ratio capability of the transmission would significantly improve fuel economy.

Conventional epicyclic gear arrangements provide input-output coaxiality, so as to permit in-line arrangement of the driving equipment and driven equipment. To some extent mechanism design, particularly bearing design, can be simplified, due in part to an offsetting effect of radial forces on the input shaft and output shaft. Design simplification can translate into design compactness, and the gearbox can be more closely coupled with the driving equipment or driven equipment.

However, this in-line arrangement is limited in some respects. It is notably characterized by a lack of versatility. When the output is coaxial and in-line with the input one input is located at one end and one output is located at the opposite end. Either end may be exclusively adaptable to the input function or the output function due to the particular arrangement of gears, bearings, clutches and brakes. In this regard conventional in-line arrangements tend to skew or imbalance the locations of the clutches, brakes and bearings to one side of the epicyclic gear, since one side is input-oriented and the other side is output-oriented. Also, the inherent compactness of epicyclic gearing may be somewhat counteracted by requisite in-line axial lengths for in-line functioning. These aspects negatively impact the design potential of the mechanism in terms of simplicity and often-concomitant compactness, which in turn militates against internal drive applicability in various contexts as well as against more proximate coupling with driving or driven equipment in general. For some applications radial output rather than axial output better suits spatial requirements.

Consequently, conventional in-line arrangements are locationally restrictive in terms of input and output connections and cannot readily accomodate more than one input member or more than one output member. Moreover, axial length as well as asymmetry or imbalance of the mechanism about the axis to either side of the epicyclic gear tends to neutralize or inhibit desired effects and characteristics.

OBJECTS OF THE INVENTION

In view of the foregoing, it is an object of the present invention to provide an epicyclic gear mechanism which is simple and compact, and which provides two forward speeds and one reverse speed.

It is further object of the present invention to provide an epicyclic gear mechanism with improved versatility in terms of input locations and output locations, as well as in terms of accomodating more than one input drive member and more than one output drive member.

Another object of this invention is to provide an epicyclic gear mechanism which can be more closely coupled with the driving equipment or the driven equipment.

Yet another object is to provide an epicyclic gear mechanism which can be used as an internal drive mechanism for many applications.

SUMMARY OF THE INVENTION

The present invention provides an epicyclic gear mechanism comprising an input drive shaft, a housing, a sun gear, a planet carrier, at least one planet gear, a sun gear shaft clutch, a sun gear shaft brake, a planet carrier shaft clutch, a planet carrier shaft brake, a sun gear shaft, and a planet carrier shaft. The drive shaft has a prime mover for rotating the drive shaft. Each planet gear is carried by the planet carrier and meshes with the sun gear and the ring gear. The sun gear shaft is attached to the sun gear, is axially aligned with and rotatable by the drive shaft, and is fixable to the housing. The planet carrier shaft is attached to the planet carrier, is axially aligned with and rotatable by the drive shaft, and is fixable to the housing. The planet carrier shaft is concentric with the drive shaft, sun gear, ring gear and sun gear shaft. The sun gear is rotated by the drive shaft when the sun gear shaft clutch is actuated and the sun gear shaft brake is deactuated. The sun gear is fixed when the sun gear shaft clutch is deactuated and the sun gear shaft brake is actuated. The planet carrier is rotated by the drive shaft when the planet carrier shaft clutch is actuated and the planet carrier shaft brake is deactuated. The planet carrier is fixed when the planet carrier shaft clutch is deactuated and the planet carrier shaft brake is actuated.

Rotation of the ring gear varies in accordance with actuation and deactuation of the sun gear shaft clutch, sun gear shaft brake, planet carrier shaft clutch and planet carrier shaft brake. The rotational speed and rotational direction of the ring gear are independent of the rotational speed and rotational direction of the drive shaft when the sun gear shaft clutch is deactuated and the planet carrier shaft clutch is deactuated. The rotational speed and rotational direction of the ring gear are equal to the rotational speed and rotational direction of the drive shaft when the sun gear shaft clutch is actuated, the planet carrier shaft clutch is actuated, the sun gear shaft brake is deactuated, and the planet carrier shaft brake is deactuated. The rotational speed of the ring gear is greater than the rotational speed of the drive shaft and the rotational direction of the ring gear is equal to the rotational direction of the drive shaft when the sun gear shaft clutch is deactuated, the planet carrier shaft clutch is actuated, the sun gear shaft brake is actuated, and the planet carrier shaft brake is deactuated. The rotational speed of the ring gear is lesser than the rotational speed of the drive shaft and the rotational direction of the ring gear is opposite the rotational direction of the drive shaft when the sun gear shaft clutch is actuated, the planet carrier shaft clutch is deactuated, the sun gear shaft brake is deactuated, and the planet carrier shaft brake is actuated.

The present invention is characterized by simplicity. It is further characterized by balance—a symmetry about the drive shaft with respect to the centrally or nearly centrally located epicyclic gear which includes the sun gear, the planet gear or gears, and the ring gear. Using the sun gear as the point of reference, the sun gear is located between, in the longitudinal direction of said drive shaft, the sun gear shaft and the planet carrier shaft. Further symmetry is contemplated by the present invention in some embodiments. The sun gear is located between, in the longitudinal direction of the drive shaft, on the one side the sun gear shaft, sun gear shaft clutch, and sun gear shaft brake, and on the opposite side the planet carrier shaft, planet carrier shaft clutch, and planet carrier shaft brake. Other parts, such as journal bearings, journal bearing supports, and control/mounting sleeves, may be similarly symmetrically placed. The sun gear in some embodiments is preferably placed equidistantly or nearly equidistantly between these and other corresponding parts of the epicyclic gear mechanism, thus enhancing the symmetry in terms of distances.

Hence, simplicity and balance accompanying a radial output are main features of the present invention. Interrelational simplicity and balance permit fewer and more proximately located elements within the mechanism. A greater potential for compactness constitutes a great space-saving advantage. A further advantage is a decreased likelihood of mechanical breakdown or malfunction. Moreover, dual-capability with regard to various functions and locations springs from the balance, the symmetrical nature, of the mechanism. With regard to ship propulsion systems, the present invention permits the use of fixed-pitch propellers by performing the reversing function. Further it permits the optimization of engine speeds at both the endurance speed and top speed condition by providing two ahead speed ratios. The nominal output-to-input speed ratios for ship propulsion, 1.0 and 1.5 forward, and 0.5 reverse, are well within the ranges of speed ratios provided by this invention. In boost/cruise engine arrangements, this invention permits the desirable "and" configuration where the cruise engine is used at the endurance condition for maximum fuel economy and with the boost engine at the full power condition. This invention permits a single prime mover to drive both a propulsion and ship service generator without incurring any stack-up length penalty. For this application, in a manner analogous to other applications, the compact mechanism is internally configured within the rotor of the ship service generator with the ring gear being integral with the rotor. The ship service generator is driven at about 1.5 times the speed of the prime mover. The secondary output drive of the mechanism is used to drive the propulsion generator at the speed of the prime mover. More generally, with regard to various impeller, wheel, chain, belt or track systems, the present invention provides a compact, two-speed, reversible drive system which can be mounted within the hub of the particular drive device. Other objects, advantages and features of this invention will become apparent from the following detailed description of the invention when considered in conjunction with the accompanying drawings.

BRIEF DESCRIPTION OF THE DRAWINGS

In order that the present invention may be clearly understood, it will now be described, by way of example, with reference to the accompanying drawings, wherein like numbers indicate the same or similar components, and wherein.

DETAILED DESCRIPTION OF THE INVENTION

Figure 1:
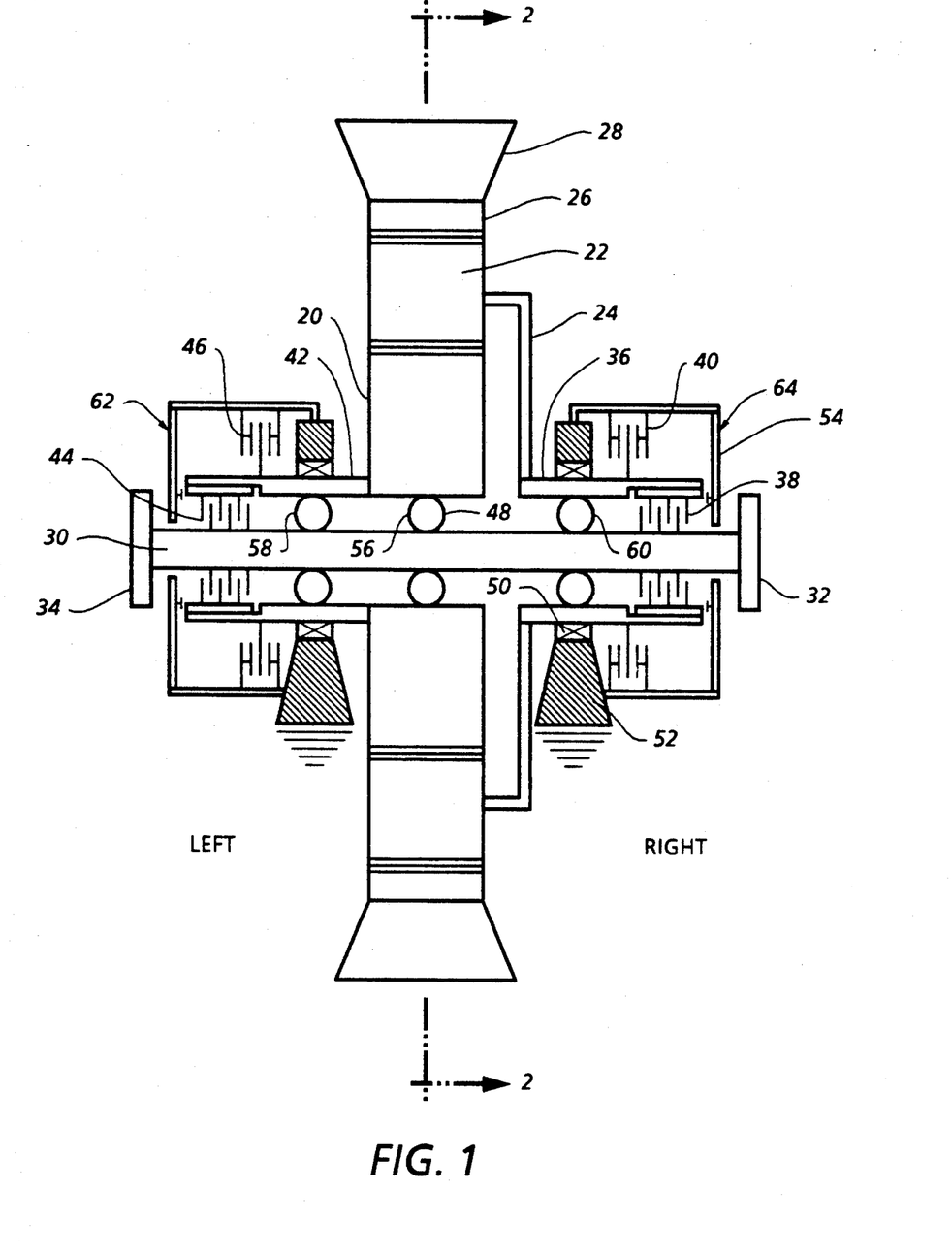
FIG. 1 is an axially longitudinal view of an epicyclic gear mechanism according to the present invention, partially in section as taken along the plane of the line 1—1 in FIG. 2
Figure 2:
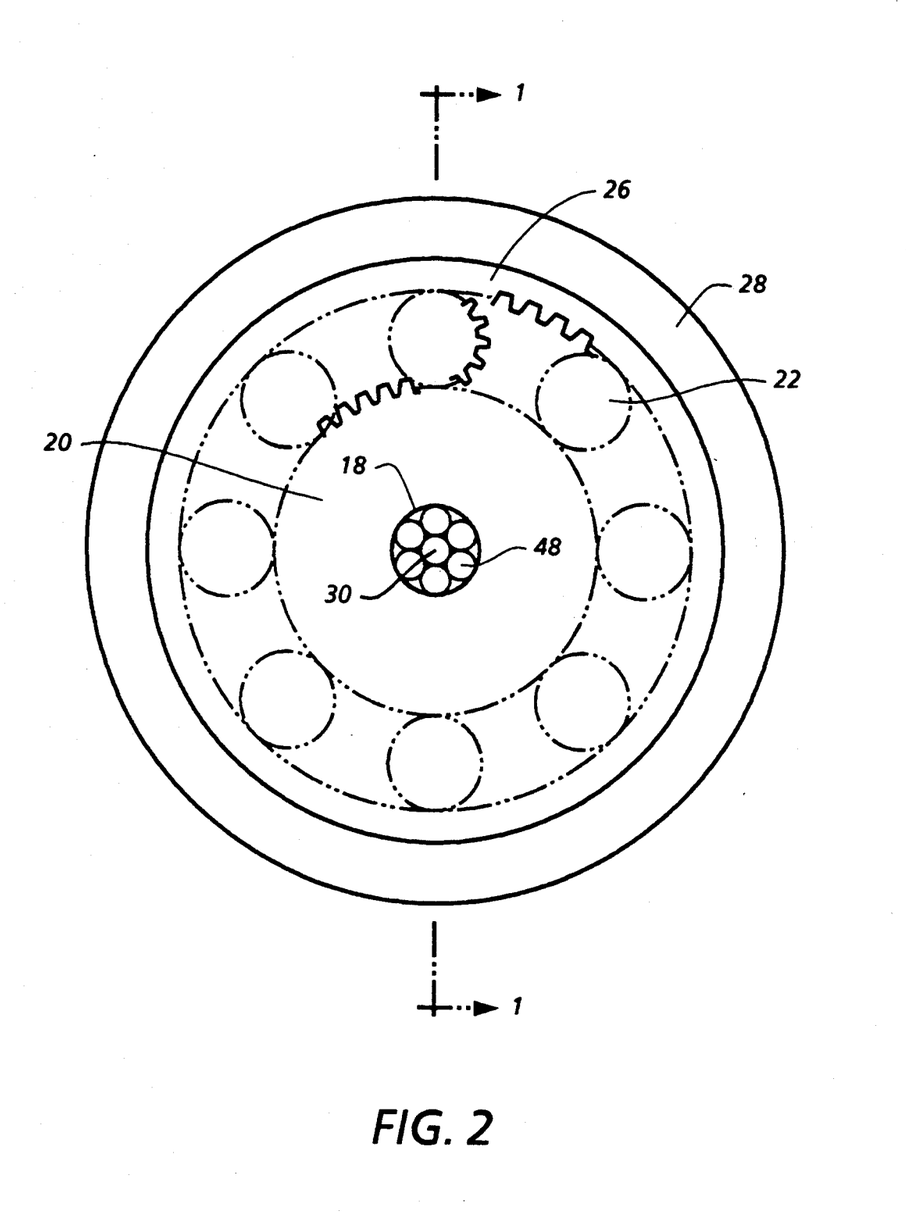
FIG. 2 is an axially transverse view, partially in section as taken along the plane of the line 2—2 in FIG. 1.

Referring now to FIG. 1, the epicyclic gear includes a sun gear 20, planet gears 22, a planet carrier 24 and a ring gear 26. Drive shaft 30 has a right-hand drive shaft flange 32 and a left-hand drive shaft flange 34 connected thereto. With reference to FIG. 2, drive shaft 30 passes through bore 18 in sun gear 20.

The prime mover is usually, but not necessarily, a high-speed device, such as, but by no means limited to, a gas turbine engine. The prime mover can be connected to either right-hand drive shaft flange 32 or left-hand drive shaft flange 34. Alternatively, two different prime movers can be accommodated by using both right-hand drive shaft flange 32 and left-hand drive shaft flange 34; the inputs of these two prime movers can have opposite rotation. If a single prime mover is attached to one flange then the opposite flange is available as a secondary output drive having the same rotational speed as the input prime mover.

Ring gear 26 is the variable speed output of the mechanism and is an integral part of output drive device 28, such that ring gear 26 and output drive device 28 are equal in both rotational speed and rotational direction. Output drive device 28 is any appropriate output drive device, such as, for example, the input pinion of a ship's reduction gear, the rotor of a ship's propulsion generator, the rotor of a ship's service generator, the wheel of a vehicle, or the drive sprocket of a chain, belt or track device.

Planet carrier shaft 36 is hollow and concentric with the right-hand end of drive shaft 30 and is connected to planet carrier 24. When planet carrier shaft clutch 38 is acutuated and planet carrier shaft brake 40 is deactuated, planet carrier shaft 36 and therefore planet carrier 24 is driven by drive shaft 30. When planet carrier shaft clutch 38 is deactuated and planet carrier shaft brake 40 is actuated, planet carrier shaft 36 and therefore planet carrier 24 is fixed.

Sun gear shaft 42 is hollow and concentric with the left-hand end of drive shaft 30 and is connected to sun gear 20. When sun gear shaft clutch 44 is actuated and sun gear shaft brake 46 is deactuated, sun gear shaft 42 and therefore sun gear 20 is driven by drive shaft 30. When sun gear shaft clutch 44 is deactuated and sun gear shaft brake 46 is actuated, sun gear shaft 42 and therefore sun gear 20 is fixed.

Concentricity of sun gear 20, planet carrier shaft 36, and sun gear shaft 42 with drive shaft 30 is maintained by anti-friction bearings 48. In some embodiments three sets of anti-friction bearings 48 are preferably used. A first set 56 of anti-friction bearings 48 is appropriately spaced about drive shaft 30, with the longitudinal midpoints of anti-friction bearings 48 defining a perpendicular plane with respect to drive shaft 30, at the point of intersection of the axis defined by drive shaft 30 with the plane defined by the circumference of sun gear 20, planet gears 22 and ring gear 26. A second set 58 of anti-friction bearings 48 is appropriately spaced about the left-hand end of drive shaft 30, with the longitudinal midpoints of anti-friction bearings 48 defining a perpendicular plane with respect to drive shaft 30, at the point of intersection of the axis defined by drive shaft 30 with the plane defined by the longitudinal midpoints of a first journal bearing 50 and a first bearing support 52. A first bearing structure 62 includes first journal bearing 50, first control/mounting sleeve 54 and first bearing support 52. First journal bearing 50, supportively located on sun gear shaft 42, is attached to first control/mounting sleeve 54, which in turn is attached to first bearing support 52. A third set 60 of anti-friction bearings 48 is appropriately spaced about the right-hand end of drive shaft 30, with the longitudinal midpoints of anti-friction bearings 48 defining a perpendicular plane with respect to drive shaft 30, at the point of intersection of the axis defined by drive shaft 30 with the plane defined by a second journal bearing 50 and a second bearing support 52. A second bearing structure 64 includes second journal bearing 50, second control/mounting sleeve 54 and second bearing support 52. Second journal bearing 50, supportively located on planet carrier shaft 36, is attached to second control/mounting sleeve 54, which is turn is attached to second bearing support 52. In some embodiments of this invention first bearing structure 62 and second bearing structure 64 are preferably located on opposite sides of the epicyclic gear, with first bearing support 52 and second bearing support 52 preferably located on the same side of drive shaft 30, as shown in FIG. 1. Sun gear shaft clutch 44 and sun gear shaft brake 46 are operated through first control/mounting sleeve 54 by a first control means. Planet carrier shaft clutch 38 and planet carrier shaft brake 40 are operated through second control/mounting sleeve 54 by the same first control means or by a different second control means. Bearing supports 52 are selected from a group including, but not limited to, foundations, gear casings and mounting brackets.

As illustrated in Table 1 below and the examples that follow, the speed characteristic of output drive device 28 is dependent upon the configuration, in terms of actuation (symbolized by "+") and deactuation

TABLE 1

|  | EXAMPLE | | | |
| --- | --- | --- | --- | --- |
|  | 1 | 2 | 3 | 4 |
| MODE OF OPERATION | first forward | second forward | reverse | independent |
| PLANET CARRIER SHAFT CLUTCH 38 | + | + | − | − |
| PLANET CARRIER SHAFT BRAKE 40 | − | − | + | + |
| SUN GEAR SHAFT CLUTCH 44 | + | − | + | − |
| SUN GEAR SHAFT BRAKE 46 | − | + | − | + |
| SPEED RATIO R | 1 | 1.2–1.7 | 0.2–0.7 | ∞ |

(symbolized by "−"), of the two clutches and two brakes, viz, planet carrier shaft clutch 38, planet carrier shaft brake 40, sun gear shaft clutch 44, sun gear shaft brake 46. It is seen that there are four possible clutch/brake configurations and four consequent modes of operation if each corresponding pair has an actuated clutch and a deactuated brake or vice versa.

EXAMPLE 1: FIRST FORWARD MODE

In the first forward mode of operation, or, in nautical terms, the "cruise" mode, both planet carrier shaft clutch 38 and sun gear shaft clutch 44 are actuated while both planet carrier shaft brake 40 and sun gear shaft brake 46 are deactuated. The rotational speed of ring gear 26, and hence the rotational speed of output drive device 28, is equal to the rotational speed of drive shaft 30. The rotational direction (i.e., clockwise or counterclockwise) of ring gear 26, and hence the rotational direction of output drive device 28, is equal to the rotational direction of drive shaft 30.

The speed ratio R of the present invention varies in accordance with the clutch-brake configuration and consequent mode of operation, where R is the rotational speed of ring gear 26 (which equals the rotational speed of output drive device 28) divided by the rotational speed of drive shaft 30. For the first forward mode of operation, $R_{1f} = 1$.

EXAMPLE 2: SECOND FORWARD MODE

In the second forward mode of operation, or "full ahead" mode, both planet carrier shaft clutch 38 and sun gear shaft brake 46 are actuated while both planet carrier shaft brake 40 and sun gear shaft clutch 44 are deactivated. The epicyclic gear mechanism is in the "solar" configuration, with sun gear 20 fixed. The rotational direction of ring gear 26, and hence the rotational direction of output drive device 28, is equal to the rotational direction of drive shaft 30.

The second forward speed ratio $R_{2f}$ is dependent upon the diameter $D_s$ of sun gear 20 and the diameter $D_r$ of ring gear 26, in accordance with the following formula:

$$R_{2f} = 1 + (D_s/D_r)$$

As a practical matter, $R_{2f}$ will vary between about 1.2 and about 1.7, inclusive, depending on $D_s$ and $D_r$.

EXAMPLE 3: REVERSE MODE

In the reverse mode of operation both planet carrier shaft brake 40 and sun gear shaft clutch 44 are actuated while both planet carrier shaft clutch 38 and sun gear shaft brake 46 are deactivated. The epicyclic gear mechanism is in the "star" configuration, with planet carrier 24 fixed. The rotational direction of ring gear 26, and hence the rotational direction of output drive device 28, is opposite the rotational direction of drive shaft 30. The reverse speed ratio $R_r$ is dependent upon the diameter $D_s$ of sun gear 20 and the diameter $D_r$ of ring gear 26, in accordance with the following formula:

$$R_r = D_s/D_r$$

As a practical matter, Rr will vary between about 0.2 and about 0.7, inclusive, depending on $D_s$ and $D_r$.

EXAMPLE 4: INDEPENDENT MODE

In the independent mode of operation both planet carrier shaft clutch 38 and sun gear shaft clutch 44 are deactivated. The rotation of ring gear 26, and hence the rotation of output drive device 28, is entirely independent from the rotation of drive shaft 30; therefore, the rotational characteristics of ring gear 26 and output drive device 28 in terms of speed and direction are entirely independent from said characteristics of drive shaft 30. Accordingly, independent speed ratio $R_i$ is undefined (symbolized by "$\infty$") by formula, because of this input-output relational independence.

For marine applications, for example, it may be useful to "crash reverse" a ship. In some embodiments, switching from second forward mode of operation to reverse mode of operation includes the following steps: (a) moving the throttle on the prime mover to the idle position; (b) deactuating planet carrier shaft clutch 38; (c) deactuating sun gear shaft brake 46; (d) actuating planet carrier shaft brake 40; (e) actuating sun gear shaft clutch 44; (f) moving the throttle on the engine to the appropriate setting for stopping the ship. When planet carrier shaft clutch 38 is deactivated, the prime mover is freed from the mechanism. When planet carrier shaft brake 40 is actuated, it absorbs the energy necessary to stop the planet gear 22/planet carrier shaft 24/planet carrier 36 assembly and to accelerate sun gear 20. When sun gear shaft clutch 44 is engaged, it absorbs the energy necessary to synchronize the speeds of sun gear 20 and the prime mover.

An axial output is obtained in alternative embodiments by engaging ring gear 26 with a rotatable auxiliary output shaft, axially aligned with drive shaft 30 or offset from and parallel with drive shaft 30. It is preferable in some embodiments to locate the auxiliary output shaft opposite the input side of the epicyclic gear. For example, bevel-type gear or offset gear can be used in different embodiments for engaging ring gear 26 with the auxiliary output shaft, with varying degrees of complexity. Alternatively, output drive device 28, with which ring gear 26 is coupled, can similarly be engaged for rotating the auxiliary output shaft.

Other embodiments of this invention will be apparent to those skilled in the art from a consideration of this specification or practice of the invention disclosed herein. Various omissions, modifications and changes to the principles described may be made by one skilled in the art without departing from the true scope and spirit of the invention which is indicated by the following claims.

What is claimed is:

1. An epicyclic gear mechanism, comprising:
   a drive shaft having a prime mover for rotating said drive shaft;
   a housing;
   a sun gear;
   a ring gear;
   a planet carrier;
   at least one planet gear, carried by said planet carrier, and meshing with said sun gear and said ring gear;
   a sun gear shaft attached to said sun gear, axially aligned with and rotatable by said drive shaft;
   a planet carrier shaft attached to said planet carrier, axially aligned with and rotatable by said drive shaft, said planet carrier shaft being coaxial with said drive shaft, sun gear, ring gear and sun gear shaft;
   a sun gear shaft clutch, disengageably coupling said sun gear shaft and said drive shaft, said sun gear shaft engaging said drive shaft when said sun gear shaft clutch is actuated, said sun gear shaft disengaging said drive shaft when said sun gear shaft clutch is deactuated;
   a sun gear shaft brake, disengageably coupling said sun gear shaft and said housing, said sun gear shaft engaging said housing when said sun gear shaft brake is actuated, said sun gear shaft disengaging said housing when said sun gear shaft brake is deactuated;
   a planet carrier shaft clutch, disengageably coupling said planet carrier shaft and said drive shaft, said planet carrier shaft engaging said drive shaft when said planet carrier shaft clutch is actuated, said planet carrier shaft disengaging said drive shaft when said planet carrier shaft clutch is deactuated;
   a planet carrier shaft brake, disengageably coupling said planet carrier shaft and said housing, said planet carrier shaft engaging said housing when said planet carrier shaft brake is actuated, said planet carrier shaft disengaging said housing when said planet carrier shaft brake is deactuated;
   control means for actuating and deactuating said sun gear shaft clutch;
   control means for actuating and deactuating said sun gear shaft brake;
   control means for actuating and deactuating said planet carrier shaft clutch; and
   control means for actuating and deactuating said planet carrier shaft brake;
   whereby said sun gear shaft is rotated by said drive shaft when said sun gear shaft clutch is actuated and said sun gear shaft brake is deactuated, said sun gear is rotated by said drive shaft when said sun gear shaft is rotated by said drive shaft, said sun gear shaft is fixed when said sun gear shaft clutch is deactuated and said sun gear shaft brake is actuated, said sun gear is fixed when said sun gear shaft is fixed, said planet carrier shaft is rotated by said drive shaft when said planet carrier shaft clutch is actuated and said planet carrier shaft brake is deactuated, said planet carrier is rotated by said drive shaft when said planet carrier shaft is rotated by said drive shaft, said planet carrier shaft is fixed when said planet carrier shaft clutch is deactuated and said planet carrier shaft brake is actuated, and said planet carrier is fixed when said planet carrier shaft is fixed;

wherein said housing includes a pair of journal bearings, a pair of journal bearing supports, and a pair of control/mounting sleeves;

whereby each said control/mounting sleeve is attached to one said journal bearing support, each said journal bearing support is coupled with one said journal bearing, one said journal bearing is supportingly set in relation to said sun gear shaft and the other said journal bearing is supportingly set in relation to said planet carrier shaft;

whereby said control/mounting sleeves contain said control means for actuating and deactuating said sun gear shaft clutch, said control means for actuating and deactuating said sun gear shaft brake, said control means for actuating and deactuating said planet carrier shaft clutch and said control means for actuating and deactuating said planet carrier shaft brake;

wherein said drive shaft extends in a longitudinal direction from one end of said drive shaft to the opposite end of said drive shaft;

wherein said sun gear is located between, in said longitudinal direction, said one end of said drive shaft and said opposite end of said drive shaft;

wherein said sun gear divides said drive shaft, in said longitudinal direction, into one side of said drive shaft and the opposite side of said drive shaft; and wherein said sun gear is located between, in the longitudinal direction of said drive shaft, on one side said sun gear shaft, said sun gear shaft clutch, said sun gear shaft brake, one said journal bearing, one said journal bearing support and one said control/mounting sleeve, and on the opposite side said planet carrier shaft, said planet carrier shaft clutch, said planet carrier shaft brake, the other said journal bearing, the other said journal bearing support and the other said control/mounting sleeve.

2. An epicyclic gear mechanism, comprising:
a drive shaft having a prime mover for rotating said drive shaft;
a housing;
a sun gear;
a ring gear;
a planet carrier;
at least one planet gear, carried by said planet carrier, and meshing with said sun gear and said ring gear;
a sun gear shaft attached to said sun gear, axially aligned with and rotatable by said drive shaft;
a planet carrier shaft attached to said planet carrier, axially aligned with and rotatable by said drive shaft, said planet carrier shaft being coaxial with said drive shaft, sun gear, ring gear and sun gear shaft;

a sun gear shaft clutch, disengageably coupling said sun gear shaft and said drive shaft, said sun gear shaft engaging said drive shaft when said sun gear shaft clutch is actuated, said sun gear shaft disengaging said drive shaft when said sun gear shaft clutch is deactuated;

a sun gear shaft brake, disengageably coupling said sun gear shaft and said housing, said sun gear shaft engaging said housing when said sun gear shaft brake is actuated, said sun gear shaft disengaging said housing when said sun gear shaft brake is deactuated;

a planet carrier shaft clutch, disengageably coupling said planet carrier shaft and said drive shaft, said planet carrier shaft engaging said drive shaft when said planet carrier shaft clutch is actuated, said planet carrier shaft disengaging said drive shaft when said planet carrier shaft clutch is deactuated;

a planet carrier shaft brake, disengageably coupling said planet carrier shaft and said housing, said planet carrier shaft engaging said housing when said planet carrier shaft brake is actuated, said planet carrier shaft disengaging said housing when said planet carrier shaft brake is deactuated;

control means for actuating and deactuating said sun gear shaft clutch;

control means for actuating and deactuating said sun gear shaft brake;

control means for actuating and deactuating said planet carrier shaft clutch; and control means for actuating and deactuating said planet carrier shaft brake;

whereby said sun gear shaft is rotated by said drive shaft when said sun gear shaft clutch is actuated and said sun gear shaft brake is deactuated, said sun gear is rotated by said drive shaft when said sun gear shaft is rotated by said drive shaft, said sun gear shaft is fixed when said sun gear shaft clutch is deactuated and said sun gear shaft brake is actuated, said sun gear is fixed when said sun gear shaft is fixed, said planet carrier shaft is rotated by said drive shaft when said planet carrier shaft clutch is actuated and said planet carrier shaft brake is deactuated, said planet carrier is rotated by said drive shaft when said planet carrier shaft is rotated by said drive shaft, said planet carrier shaft is fixed when said planet carrier shaft clutch is deactuated and said planet carrier shaft brake is actuated, and said planet carrier is fixed when said planet carrier shaft is fixed;

wherein said drive shaft extends in a longitudinal direction from one end of said drive shaft to the opposite end of said drive shaft;

wherein said sun gear is located between, in said longitudinal direction, said one end of said drive shaft and said opposite end of said drive shaft; and wherein said sun gear divides said drive shaft, in said longitudinal direction, into one side of said drive shaft and the opposite side of said drive shaft.

3. An epicyclic gear mechanism as in claim 2, wherein the rotational speed and the rotational direction of said ring gear vary in accordance with actuation and deactuation of said sun gear shaft clutch, sun gear shaft brake, planet carrier shaft clutch and planet carrier shaft brake.

4. An epicyclic gear mechanism as in claim 3 wherein said rotational speed and said rotational direction of said ring gear are independent of said rotational speed and said rotational direction of said drive shaft when said sun gear shaft clutch is deactuated and said planet carrier shaft clutch is deactuated.

5. An epicyclic gear mechanism as in claim 3 wherein said rotational speed and said rotational direction of said ring gear are equal to said rotational speed and said rotational direction of said drive shaft when said sun gear shaft clutch is actuated, said planet carrier shaft clutch is actuated, said sun gear shaft brake is deactuated, and said planet carrier shaft brake is deactuated.

6. An epicyclic gear mechanism as in claim 3 wherein said rotational speed of said ring gear is greater than said rotational speed of said drive shaft and said rotational direction of said ring gear is equal to said rotational direction of said drive shaft when said sun gear shaft clutch is deactuated, said planet carrier shaft clutch is actuated, said sun gear shaft brake is actuated, and said planet carrier shaft brake is deactuated.

7. An epicyclic gear mechanism as in claim 3 wherein said said rotational speed of said ring gear is lesser than the rotational speed of said drive shaft and said rotational direction of said ring gear is opposite said rotational direction of said drive shaft when said sun gear shaft clutch is actuated, said planet carrier shaft clutch is deactuated, said sun gear shaft brake is deactuated, and said planet carrier shaft brake is actuated.

8. An epicyclic gear mechanism as in claim 3 having selective variability of said rotational speed and said rotational direction of said ring gear, wherein said rotational speed and said rotational direction of said ring gear are independent of said rotational speed and said rotational direction of said drive shaft when said sun gear shaft clutch is deactuated and said planet carrier shaft clutch is deactuated; said rotational speed and said rotational direction of said ring gear are equal to said rotational speed and said rotational direction of said drive shaft when said sun gear shaft clutch is actuated, said planet carrier shaft clutch is actuated, said sun gear shaft brake is deactuated, and said planet carrier shaft brake is deactuated; said rotational speed of said ring gear is greater than said rotational speed of said drive shaft and said rotational direction of said ring gear is equal to said rotational direction of said drive shaft when said sun gear shaft clutch is deactuated, said planet carrier shaft clutch is actuated, said sun gear shaft brake is actuated, and said planet carrier shaft brake is deactuated; said rotational speed of said ring gear is lesser that said rotational speed of said drive shaft and said rotational direction of said ring gear is opposite said rotational direction of said drive shaft when said sun gear shaft clutch is actuated, said planet carrier shaft clutch is deactuated, said sun gear shaft brake is deactuated, and said planet carrier shaft brake is actuated.

9. An epicyclic gear mechanism as in claim 2, further comprising an output drive member which is coupled with said ring gear and rotated by said ring gear.

10. An epicyclic gear mechanism as in claim 2 wherein said drive shaft includes at least one protruding member for engagement with said prime mover.

11. An epicyclic gear mechanism as in claim 10 wherein said protruding member is a flange.

12. An epicyclic gear mechanism as in claim 2 wherein said sun gear has a bore for axial alignment of said drive shaft.

13. An epicyclic gear mechanism as in claim 2 wherein said sun gear shaft has a bore for axial alignment of said drive shaft.

14. An epicyclic gear mechanism as in claim 2 wherein said planet carrier shaft has a bore for axial alignment of said drive shaft.

15. An epicyclic gear mechanism as in claim 2 further comprising a plurality of anti-friction bearings for maintaining said concentricity of said drive shaft, sun gear, sun gear shaft and planet carrier shaft.

16. An epicyclic gear mechanism as in claim 2 wherein said housing includes at least one journal bearing and at least one journal bearing support, each said journal bearing support being coupled with one said journal bearing.

17. An epicyclic gear mechanism as in claim 16 wherein at least one said journal bearing is supportingly set in relation to said sun gear shaft.

18. An epicyclic gear mechanism as in claim 16 wherein at least one said journal bearing is supportingly set in relation to said planet carrier shaft.

19. An epicyclic gear mechanism as in claim 16 wherein said journal bearing support is a foundation.

20. An epicyclic gear mechanism as in claim 16 wherein said journal bearing support is a gear casing.

21. An epicyclic gear mechanism as in claim 16 wherein said journal bearing support is a mounting bracket.

22. An epicyclic gear mechanism as in claim 2 wherein said housing includes at least one control/mounting sleeve which contains said control means for actuating and deactuating said sun gear shaft clutch.

23. An epicyclic gear mechanism as in claim 2 wherein said housing includes at least one control/mounting sleeve which contains said control means for actuating and deactuating said sun gear shaft brake.

24. An epicyclic gear mechanism as in claim 2 wherein said housing includes at least one control/mounting sleeve which contains said control means for actuating and deactuating said planet carrier shaft clutch.

25. An epicyclic gear mechanism as in claim 2 wherein said housing includes at least one control/mounting sleeve which contains said control means for actuating and deactuating said planet carrier shaft brake.

26. An epicyclic gear mechanism as in claim 16 wherein said housing includes at least one control/mounting sleeve which is attached to one said journal bearing support and which contains said control means for actuating and deactuating said sun gear shaft clutch.

27. An epicyclic gear mechanism as in claim 16 wherein said housing includes at least one control/mounting sleeve which is attached to one said journal bearing support and which contains said control means for actuating and deactuating said sun gear shaft brake.

28. An epicyclic gear mechanism as in claim 16 wherein said housing includes at least one control/mounting sleeve which is attached to one said journal bearing support and which contains said control means for actuating and deactuating said planet carrier shaft clutch.

29. An epicyclic gear mechanism as in claim 16 wherein said housing includes at least one control/mounting sleeve which is attached to one said journal bearing support and which contains said control means for actuating and deactuating said planet carrier shaft brake.

30. An epicyclic gear mechanism as in claim 2 wherein said sun gear is located between, in said longitudinal direction, on said one side said sun gear shaft, and on said opposite side said planet carrier shaft.

31. An epicyclic gear mechanism as in claim 2 wherein said sun gear is located between, in said longitudinal direction, on said one side said sun gear shaft, sun gear shaft clutch, and sun gear shaft brake, and on said opposite side said planet carrier shaft, planet carrier shaft clutch, and planet carrier shaft brake.

32. An epicyclic gear mechanism as in claim 2 wherein said sun gear is located at a point in said longitudinal direction which is nearly equidistant between said one end of said drive shaft and said opposite end of said drive shaft.

33. An epicyclic gear mechanism as in claim 31 wherein said sun gear is located at a point in said longitudinal direction of said drive shaft which is nearly equidistant between said one end of said drive shaft and said opposite end of said drive shaft, which is nearly equidistant between said sun gear shaft clutch and said planet carrier shaft clutch, and which is nearly equidistant between said sun gear shaft brake and said planet carrier shaft brake.

34. An epicyclic gear mechanism as in claim 1 wherein said sun gear is located at a point in said longitudinal direction which is nearly equidistant between said one end of said drive shaft and said opposite end of said drive shaft, which is nearly equidistant between said sun gear shaft clutch and said planet carrier shaft clutch, which is nearly equidistant between said sun gear shaft brake and said planet carrier shaft brake, which is nearly equidistant between one said journal bearing and the other said journal bearing, which is nearly equidistant between one said journal bearing support and the other said journal bearing support, and which is nearly equidistant between one said control/mounting sleeve and the other said control/mounting sleeve.

* * * * *

UNITED STATES PATENT AND TRADEMARK OFFICE
CERTIFICATE OF CORRECTION

PATENT NO. : 5,152,725
DATED : October 6, 1992
INVENTOR(S) : Samuel R. Shank, Jr.

It is certified that error appears in the above-indentified patent and that said Letters Patent is hereby corrected as shown below:

On the title page, item (73) Assignee, should read --
The United States of America as represented by the Secretary of Navy
Washington, D. C. --.

Above the Abstract, insert Attorney, Agent, or Firm.
-- Luther Marsh, Howard Kaiser --.

Signed and Sealed this

Twenty-ninth Day of March, 1994

Attest:

BRUCE LEHMAN

Attesting Officer        Commissioner of Patents and Trademarks